(12) United States Patent
Kim et al.

(10) Patent No.: US 10,000,201 B2
(45) Date of Patent: Jun. 19, 2018

(54) DRIVING MODE CONTROL METHOD AND APPARATUS OF HYBRID ELECTRIC VEHICLE

(71) Applicant: Hyundai Motor Company, Seoul (KR)

(72) Inventors: Sang Joon Kim, Seoul (KR); Seong Ik Park, Seoul (KR); Kwon Chae Chung, Seoul (KR); Il Kwon Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/265,192

(22) Filed: Sep. 14, 2016

(65) Prior Publication Data

US 2017/0291595 A1 Oct. 12, 2017

(30) Foreign Application Priority Data

Apr. 8, 2016 (KR) .................. 10-2016-0043419

(51) Int. Cl.
*B60W 20/00* (2016.01)
*F16D 25/00* (2006.01)
*B60K 6/387* (2007.10)
*B60W 20/19* (2016.01)
*B60W 30/192* (2012.01)
(Continued)

(52) U.S. Cl.
CPC .............. *B60W 20/19* (2016.01); *B60K 6/26* (2013.01); *B60K 6/387* (2013.01); *B60K 6/485* (2013.01); *B60W 10/023* (2013.01); *B60W 10/06* (2013.01); *B60W 10/08* (2013.01); *B60W 30/192* (2013.01); *F16D 25/00* (2013.01); *B60K 2006/268* (2013.01); *B60W 2510/125* (2013.01); *B60W 2710/021* (2013.01); *B60W 2710/0672* (2013.01); *B60W 2710/085* (2013.01); *B60Y 2200/92* (2013.01); *B60Y 2300/188* (2013.01); *Y10S 903/93* (2013.01)

(58) Field of Classification Search
USPC .......................................................... 701/22
See application file for complete search history.

(56) References Cited

U.S. PATENT DOCUMENTS 9,371,069 B2 * 6/2016 Kim ...................... B60W 10/06
2010/0286858 A1 * 11/2010 Otokawa ................ B60K 6/365
701/22
(Continued)

FOREIGN PATENT DOCUMENTS

JP 2000-219062 8/2000
JP 2007-83796 4/2007
(Continued)

OTHER PUBLICATIONS

Korean Notice of Allowance (Appln. No. 10-2016-0043419) dated Aug. 22, 2017.

*Primary Examiner* — Tyler J Lee
(74) *Attorney, Agent, or Firm* — Mintz Levin Cohn Ferris Glovsky and Popeo, P.C.; Peter F. Corless

(57) ABSTRACT

A driving mode control method and apparatus of a hybrid electric vehicle are provided. The driving mode control method includes decreasing a torque of an engine when a first driving mode in which both the engine and a first motor are driven is switched to a second driving mode driven by the first motor and applying a torque of a second motor. A clutch is then opened when a difference between the engine torque and the second motor torque is less than a first threshold torque.

17 Claims, 4 Drawing Sheets

(51) Int. Cl.
  *B60W 10/06* (2006.01)
  *B60W 10/08* (2006.01)
  *B60W 10/02* (2006.01)
  *B60K 6/485* (2007.10)
  *B60K 6/26* (2007.10)

(56) References Cited

U.S. PATENT DOCUMENTS

2011/0160947 A1* 6/2011 Ideshio ................ B60K 6/387
  701/22
2015/0344021 A1* 12/2015 Kim ..................... B60W 10/06
  701/22

FOREIGN PATENT DOCUMENTS

| KR | 10-2007-0062425 | 6/2007 |
| KR | 10-2009-0062871 | 6/2009 |
| KR | 10-2014-0048003 | 4/2014 |
| KR | 10-1558376 B1 | 10/2015 |
| KR | 10-2015-0136404 | 12/2015 |
| KR | 10-1583976 B1 | 1/2016 |

\* cited by examiner

DRIVING MODE CONTROL METHOD AND APPARATUS OF HYBRID ELECTRIC VEHICLE

CROSS REFERENCE TO RELATED APPLICATION(S)

This application claims the benefit of Korean Patent Application No. 10-2016-0043419, filed on Apr. 8, 2016, which is hereby incorporated by reference as if fully set forth herein.

BACKGROUND

Field of the Invention

The present invention relates to a hybrid electric vehicle, and more particularly, to a driving mode control method and an apparatus of a hybrid electric vehicle.

Discussion of the Related Art

Hybrid electric vehicles (hereinafter, referred to as "hybrid vehicles") may include various power transmission apparatuses using an engine and a motor as a power source. These power transmission apparatuses include series types, parallel types, power split types, etc. A hybrid vehicle may provide an electric vehicle (EV) mode and a hybrid electric vehicle (HEV) mode as driving modes. The EV mode is used to drive the vehicle using the driving of a motor based on battery power. The HEV mode is used to supply power to the vehicle using both a motor and an engine.

Among parallel types of hybrid vehicles that provide a plurality of driving modes, some types include an engine clutch installed between an engine and a drive motor, and thus, a drive shaft is driven by the motor when the engine clutch is open and the drive shaft is driven by the engine and the motor when the engine clutch is locked up. According to a driving situation, when a torque required for acceleration is greater than a motor torque due to acceleration intention of a driver while a hybrid vehicle travels in the EV mode, power of the engine may be additionally transmitted through lock-up of the engine clutch.

In contrast, when the torque required for acceleration decreases due to deceleration intention of a driver allowing the hybrid vehicle to travel by power of the motor, the engine clutch may be opened to drive the hybrid vehicle by switching from the HEV mode to the EV mode. Notably, in performing lock-up/opening control of the engine clutch, a process of decreasing an input torque transmitted to the engine clutch from the engine, etc. in the HEV mode is required in advance since impact may occur by decrease of a torque transmitted to a drive shaft when the engine clutch is opened from a locked-up state.

A driver may feel various driving comforts in a shift process of accelerated or decelerated driving of a vehicle rather than in constant speed driving of a vehicle (e.g., the drive may feel the vehicle reaction to an increase and decrease in vehicle speed) and impact caused by opening of the engine clutch is transferred to the entire vehicle thus generating driving discomfort. In addition, the driver may feel discomfort or considerable physical fatigue due to continuously generated impacts. Accordingly, in controlling opening of the engine clutch, even when an input torque from the engine is transmitted to the drive shaft, the input torque should be decreased to a level unrecognizable to the driver and then it is necessary to enable vehicle driving in the EV mode by releasing the engine clutch and turning off the engine (i.e., cutting off fuel supply).

Although an attempt to reduce fuel injected quantity supplied to the engine has been performed as a method of decreasing the input torque from the engine, a method of reducing fuel injected quantity is disadvantageous in that switching of a driving mode is slow. Therefore, a method differentiated from the conventional technique is needed for more rapid driving mode switching.

SUMMARY

Accordingly, the present invention is directed to a driving mode control method and apparatus of a hybrid electric vehicle that substantially obviate one or more problems due to limitations and disadvantages of the related art. Specifically, an object of the present invention is to provide a driving mode control method and apparatus of a hybrid electric vehicle using an integrated starter generator (ISG) connected to an engine to decrease an input torque from the engine, etc.

The objects that can be achieved through the present invention are not limited to what has been particularly described hereinabove and other technical objects not described herein will be more clearly understood by persons skilled in the art from the following detailed description.

To achieve these objects and other advantages and in accordance with the purpose of the invention, as embodied and broadly described herein, a driving mode control method may include decreasing a torque of an engine (e.g., an engine torque) when a first driving mode in which both the engine and a first motor are driven is switched to a second driving mode driven by the first motor; applying a torque of a second motor (e.g., a second motor torque); and opening a clutch when a difference between the engine torque and the second motor torque is less than a first threshold torque.

The applying of the second motor torque may include applying the second motor torque in consideration of the engine torque, a torque of the first motor (e.g., a first motor torque), and a required torque for acceleration. The opening of the clutch may include releasing fluid pressure for operating the clutch. The releasing of the fluid pressure may include adjusting the torque such that a sum of the engine torque and the second motor torque is equal to a second threshold torque based on a decrease of the engine torque.

When a difference between the engine torque and the second motor torque is less than the first threshold torque and the clutch is in a locked-up state, the method may further include cutting off supply of fuel for driving the engine when the engine torque is less than a third threshold torque. The second motor may be an integrated starter generator (ISG) connected to the engine. The applying of the second motor torque may include applying the second torque up to a minimum torque of the second motor torque at a predetermined rate. The clutch may be disposed between the engine and the first motor.

The present invention may provide a computer-readable recording medium in which a program for executing the method is recorded.

In another aspect of the present invention, a driving mode control apparatus may include a controller configured to decrease a torque of an engine when a first driving mode in which both the engine and a first motor are driven is switched to a second driving mode driven by the first motor and apply a torque of a second motor; and a communication unit configured to transmit a control signal to the engine, the first motor, and the second motor, wherein the controller is configured to open a clutch when a difference between the engine torque and the second motor torque is less than a first threshold torque.

The controller may be configured to apply the second motor torque in consideration of the engine torque, a torque of the first motor, and a required torque for acceleration. The controller may further be configured to release fluid pressure for operating the clutch. The controller may be configured to adjust the torque such that a sum of the engine torque and the second motor torque is equal to a second threshold torque based on a decrease of the engine torque.

When a difference between the engine torque and the second motor torque is less than the first threshold torque and the clutch is in a locked-up state, the controller may be configured to cut off supply of fuel for driving the engine when the engine torque is less than a third threshold torque. The second motor may be an integrated starter generator (ISG) connected to the engine. The controller may further be configured to apply the second torque up to a minimum torque of the second motor torque at a predetermined rate. The clutch may be disposed between the engine and the first motor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION OF THE INVENTION

Figure 1:
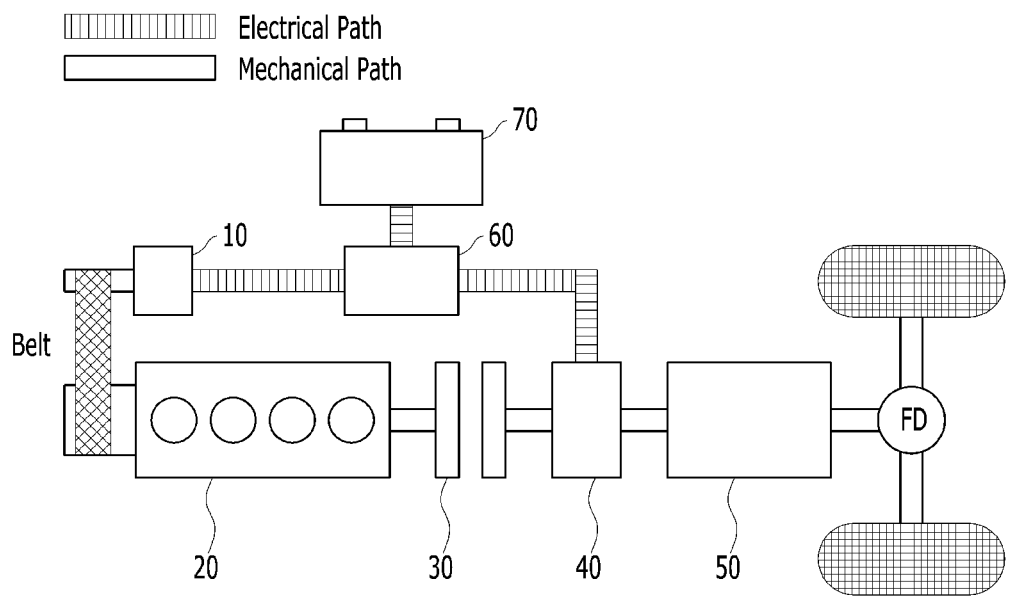
FIG. 1 is a diagram illustrating the structure of a driving mode control system of a hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. In the following description and attached drawings, a detailed description of known functions or configurations will be omitted when it may obscure the subject matter of the present invention.

The present invention relates to a clutch input torque control technique for releasing an engine clutch of a hybrid vehicle of a parallel type. Generally, the hybrid vehicle of the parallel type may be classified, according to a mounted position of a motor, into a transmission mounted electric device (TMED) structure in which the motor is mounted in a transmission and a flywheel mounted electric device (FMED) structure in which the motor is attached into an engine. Usually, the former is referred to as hard hybrid and the latter is referred to as soft hybrid.

In a power type, as opposed to an FMED in which power is transmitted to a transmission while being interlocked since there is no clutch between the engine and the motor, a TMED is capable of traveling by the motor alone since the engine clutch is present between the engine and the motor. The hybrid vehicle may provide an EV mode and an HEV mode as driving modes by the TMED structure. The EV mode may be used to drive the vehicle through driving of the motor based on battery power and the HEV mode may be used to supply power to the vehicle through both the motor and the engine. Specifically, the present invention relates to an input torque control method and apparatus of an engine clutch for opening the engine clutch of a hybrid vehicle of a TMED scheme.

The hybrid vehicle of the TMED scheme may include a power transmission device in which an engine, a drive motor, and a transmission are arranged on one drive shaft and the engine clutch may be disposed between the engine and the drive motor. An input torque $T_{E/C\ INPUT}$ of the engine clutch may be calculated by Equation 1 by an engine torque $T_{ENG}$, an ISG torque $T_{ISG}$, and a friction torque $T_{Friction}$.

$$T_{E/C\ INPUT} = T_{ENG} - T_{Friction} + T_{ISG} \quad \text{Equation 1}$$

In particular, to open the engine clutch so that only a torque of the drive motor becomes a power source according to mode switching from the HEV mode to the EV mode, the input torque $T_{E/C\ INPUT}$ of the engine clutch may be maintained at a predetermined value or less for a predetermined time ($T_{E/G\ INPUT} \leq T_{THR}$ (a threshold torque capable of adjusting the opening of the clutch)). Accordingly, impact and sense of difference caused by cutoff of an input torque transmitted to a drive shaft when the engine clutch is open may be minimized.

Generally, in the hybrid vehicle of the TMED scheme, the ISG torque has adjusted the level of the input torque by varying only the engine torque as a control factor without concerning control for decreasing the input torque. In other words, the ISG torque has adjusted only the engine torque by reducing fuel injected quantity supplied to the engine.

The drive motor may be configured to transmit power to the vehicle and the ISG may be connected to the engine to operate as a starter of the engine and a generator. The drive motor and the ISG may be configured to supply power to the hybrid vehicle together with the engine and function as generators for converting mechanical energy into electric energy. For example, the ISG may be a hybrid starter and generator (HSG) motor.

Generally, it may be difficult to rapidly adjust the opening of the engine clutch of the hybrid vehicle of the TMED scheme by adjusting only the engine torque and consumption of fuel supplied to the engine is high. The present invention provides an input torque control method and apparatus of an engine clutch through rapid cutoff of fuel supply to the engine by supplying a charging/discharging torque of an ISG.

A description of the structure of a driving mode control system of a hybrid electric vehicle having a TMED scheme will be given with reference to FIG. 1 and a detailed description of a driving mode control method based on the driving mode control system will be given with reference to FIG. 2. The effects of the present invention will be described with reference to FIG. 3 and a driving mode control apparatus of a hybrid electric vehicle will be described with reference to FIG. 4.

FIG. 1 is a diagram illustrating the structure of a driving mode control system of a hybrid vehicle according to an exemplary embodiment of the present invention. Referring to FIG. 1, the driving mode control system may include an ISG 10, an engine 20, an engine clutch 30, a drive motor 40, a transmission 50, an inverter 60, and a battery 70. Constituent elements illustrated in FIG. 1 are not always necessary and the driving mode control system may be implemented with more elements or fewer elements.

As an example of a power train of a hybrid vehicle will now be described with reference to FIG. 1. The engine clutch 30 may be disposed between the engine 20 and the drive motor (hereinafter, "motor") 40 to selectively connect the engine 20 to the motor 40 based on a driving mode of the hybrid vehicle. The engine clutch 30 may be operated by an electric oil pump (not illustrated) and the electric oil pump may be configured to supply fluid pressure for operating the transmission 50 and the engine clutch 30 in consideration of the driving mode of the vehicle.

The hybrid vehicle may include the motor 40 and the ISG 10. The motor 40 may be configured to transmit power to the vehicle and the ISG 10 may be connected to an engine shaft pulley through a belt and may operate as a starter of the engine 20 and a generator. The drive motor and the ISG may be configured to supply power to the hybrid vehicle together with the engine and function as generators for converting mechanical energy into electric energy. As an exemplary embodiment, the ISG 10 may be an HSG motor. The battery 70 may be configured to supply electric energy to the motor and other components through a main relay. An output voltage of the battery 70 may be supplied to the motor by driving (ON) of the main relay and, conversely, power generated from the motor may be stored in the battery.

Figure 2:
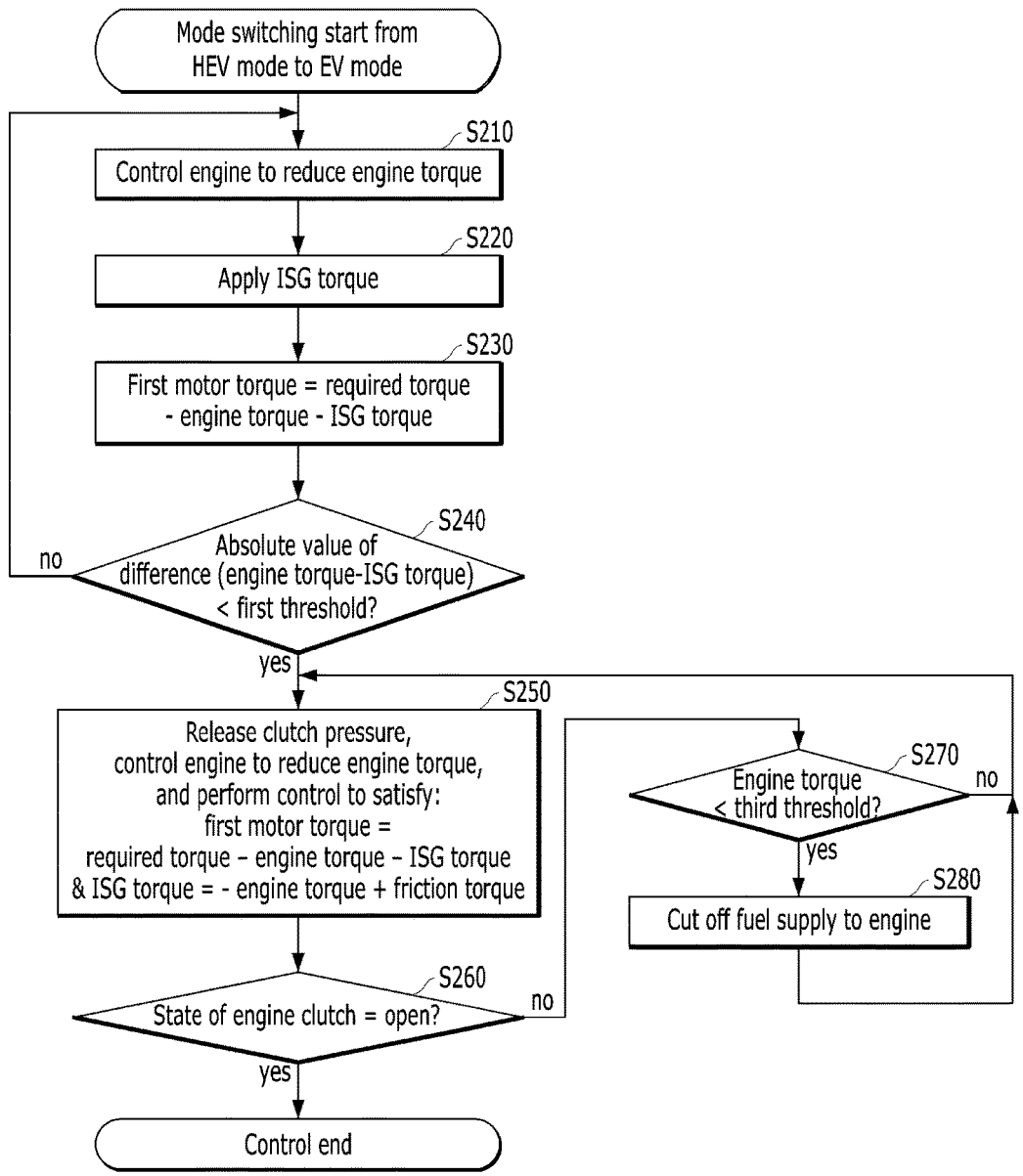
FIG. 2 is a flowchart illustrating a driving mode control method of a hybrid electric vehicle according to an exemplary embodiment of the present invention.

FIG. 2 is a flowchart illustrating a driving mode control method of a hybrid electric vehicle according to an exemplary embodiment of the present invention. The present invention may be performed in a situation in which the hybrid vehicle is switched from an HEV driving mode to an EV driving mode and the motor and the engine in the HEV driving mode are disposed on the same drive shaft by lock-up of the engine clutch.

Referring to FIG. 2, when switching from the HEV driving mode to the EV driving mode is started, a driving mode control apparatus may be configured to operate an engine to reduce an engine torque (S210). For example, the driving mode control apparatus may be configured to execute overall control of the motor, the engine, etc. and may be a hybrid control unit (HCU).

The HCU may be a main operation processing unit of the hybrid vehicle and may be configured to exchange velocity and torque information via controller area network (CAN) communication with controllers such as a motor control unit (MCU), an engine management system (EMS), a transmission control unit (TCU), and a battery management system (BMS). The HCU may be configured to distribute driving force of the vehicle and manage a vehicle driving mode.

Furthermore, the driving mode control apparatus may be configured to transmit a control signal for reducing the torque of the engine to the engine through the EMS. The driving mode control apparatus may be configured to apply an ISG torque having an opposite force direction to the engine torque while reducing the engine torque (S220). Since an input torque of the engine clutch is affected by a torque caused by the ISG as well as a torque caused by the engine, the input torque may be rapidly reduced by operating the engine and simultaneously operating the ISG.

As an example, when the driving mode control apparatus is the HCU, the HCU may be configured to transmit a control signal for applying the ISG torque of an opposite direction to the engine torque to the ISG using the MCU for operating the ISG. Upon adjustment of the engine torque and the ISG torque, the driving mode control apparatus may consider a motor torque (S230). The motor torque has a relationship of Equation 2 between a required torque for acceleration and deceleration, the engine torque, and the ISG torque.

$$\text{motor torque} = \text{required torque} - \text{engine torque} - \text{ISG torque} \quad \text{Equation 2}$$

In other words, the driving mode control apparatus may be configured to execute a control operation for reducing the engine torque and simultaneously adjust the ISG torque. The adjustment amount of the ISG torque may vary with the required torque according to Equation 2.

The driving mode control apparatus may further be configured to monitor a difference between the engine torque and the ISG torque continuously or at a predetermined period while adjusting the engine torque and the ISG torque. When the difference between the engine torque and the ISG torque is less than a first preset threshold $T_{THR}$ (Yes path in step S240), the driving mode control apparatus may be configured to release pressure supplied to an oil pump for operating the engine clutch to open the engine clutch (S250).

The first threshold $T_{THR}$ represents a threshold torque value capable of adjusting the opening of the engine clutch. Desirably, when there is no input torque of the engine clutch, since opening of the engine clutch does not generator impact, the first threshold may be set to 0. The driving mode control apparatus may be configured to determine whether the engine clutch is an open state (S260).

Even when the driving mode control apparatus releases pressure supplied to an oil pump for operating the engine clutch, the engine clutch may be in a locked-up state or a sleep state by a response delay and other systems. When the engine torque is less than a third preset threshold (Yes path of S270) while the engine clutch is not open (No path of S260), the driving mode control apparatus may be configured to cut off fuel supply to the engine (S280).

Figure 3:
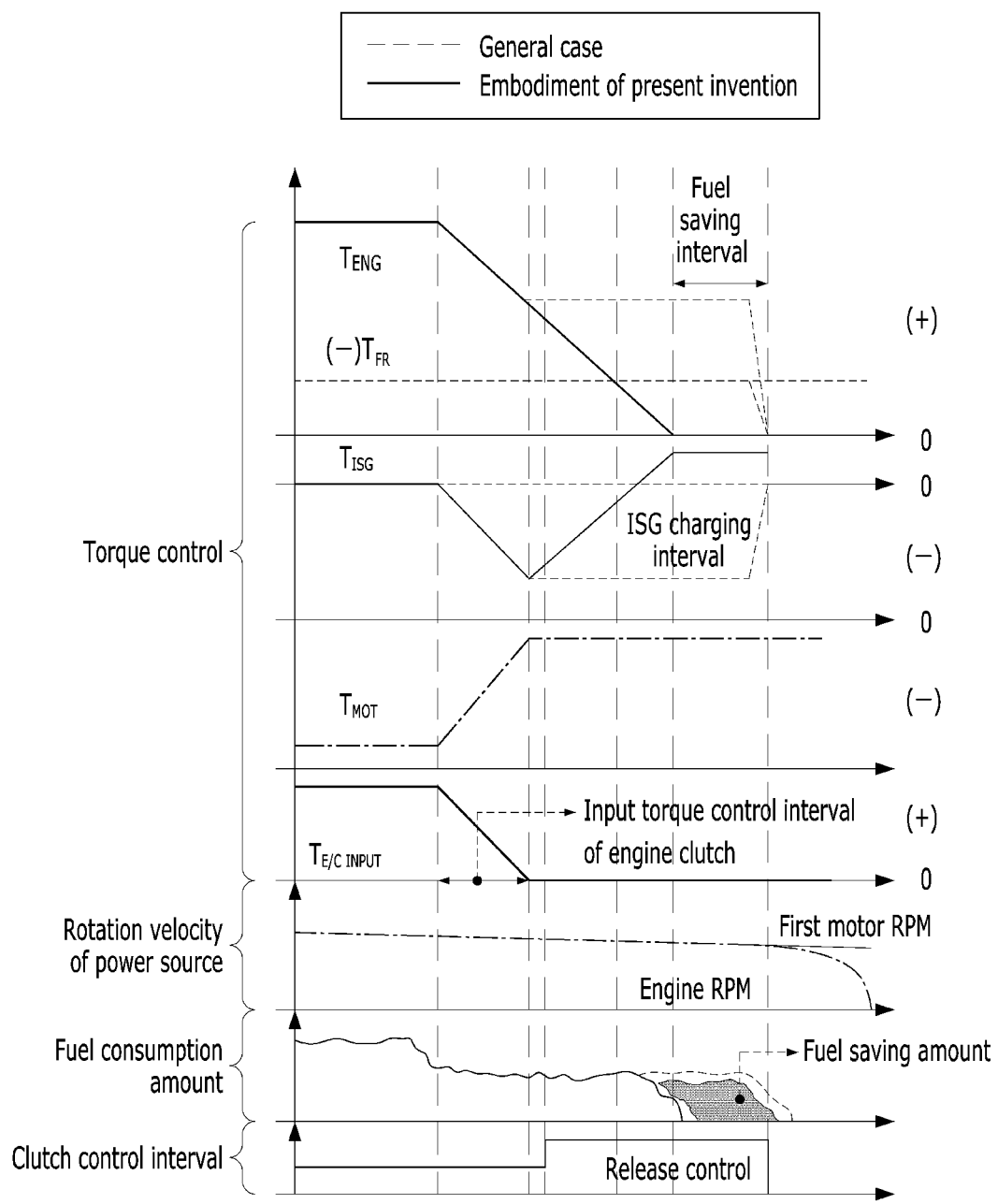
FIG. 3 is a diagram illustrating effects of a driving mode control method and apparatus of a hybrid electric vehicle according to an exemplary embodiment of the present invention.

FIG. 3 is a diagram illustrating effects of a driving mode control method and apparatus of a hybrid electric vehicle according to an exemplary embodiment of the present invention. Referring to FIG. 3, magnitude of an engine torque $T_{ENG}$, magnitude of friction torque $T_{FR}$, magnitude of an ISG torque $T_{ISG}$, magnitude of a motor torque $T_{MOT}$, magnitude of an input torque $T_{E/c\ INPUT}$ of an engine clutch over time, rotation velocity of a power source, consumption amount of fuel supplied to an engine, and an opening control interval of an engine clutch may be confirmed.

When switching from an HEV driving mode to an EV driving mode is started, a driving mode control apparatus may be configured to decrease an engine torque. At the same time, the driving mode control apparatus may be configured to decrease an input torque of an engine clutch by applying an ISG charge torque of an opposite direction to the engine torque. An ISG torque when an ISG rotates in a negative direction is referred to as an ISG charge torque and an ISG torque when the ISG rotates in a positive direction is referred to as an ISG discharge torque.

Although the ISG may be configured to supply power to the engine as a motor, the ISG may operate as a generator. In the present invention, the ISG may operate as a generator while using a charge torque by rotating in an opposite direction to the direction of the engine and functions to decrease the input torque to the engine clutch by applying the ISG charge torque to the engine. The driving mode control apparatus may be configured to release pressure applied to an oil pump for operating the engine clutch when the input torque is less than a first threshold which is capable of adjusting the opening of the engine clutch. Notably, even when pressure applied to the oil pump is released, the engine clutch may be closed.

When the engine clutch is not in an open state (e.g., remains in a closed state) although pressure applied to the oil pump is released, the driving mode control apparatus may be configured to adjust the ISG torque corresponding to the engine torque to continue to decrease the input torque of the engine clutch even when the ISG charge torque reaches a minimum value (e.g., a limitation torque of the ISG torque). In particular, the driving mode control apparatus may be configured to perform a control operation to compensate for a negative torque of the engine torque by applying the ISG discharge torque. When a predetermined period of time elapses after the input torque reaches a predetermined value capable of adjusting the opening of the engine clutch, the driving mode control apparatus may be configured to perform opening adjustment of the engine clutch.

Figure 4:
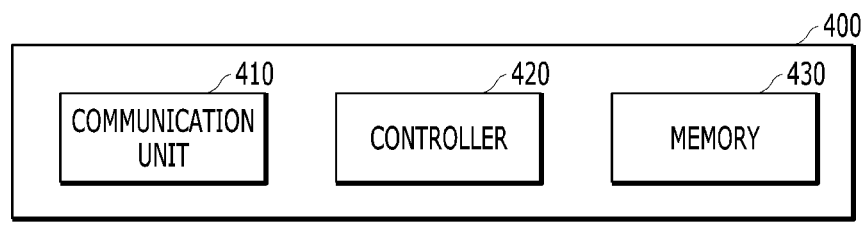
FIG. 4 is a diagram illustrating a driving mode control apparatus of a hybrid electric vehicle according to an exemplary embodiment of the present invention.

FIG. 4 is a diagram illustrating a driving mode control apparatus of a hybrid electric vehicle according to an exemplary embodiment of the present invention. Referring to FIG. 4, the driving mode control apparatus may include a communication unit 410, a controller 420, and a memory 430. Constituent elements illustrated in FIG. 4 are not always necessary and the driving mode control apparatus may be implemented with more elements or fewer elements.

Particularly, the communication unit 410 may be configured to exchange signals and data for operating an engine, a motor, an ISG, and an engine clutch. The controller 420 may be configured to perform data processing and operation for controlling the driving mode control apparatus 400. As an exemplary embodiment, when a first driving mode in which both the engine and the motor are driven is switched to a second driving mode driven by a first motor, the controller 420 may be configured to decrease an engine torque, apply a second motor torque, and adjust the opening of a clutch when a difference between the engine torque and the second motor torque is less than a first threshold torque (e.g., greater than about 0).

The memory 430 represents a space and/or a storage region in which predetermined program code for storing overall operation of the driving mode control apparatus 400 and data which is input/output when an operation caused by the program code is performed are stored and is provided in the form of an electrically erasable and programmable read only memory (EEPROM), a flash memory (FM), a hard disk drive (HDD), etc.

The driving mode control method according to the above-described exemplary embodiment may be implemented as a computer-executable program and stored in a computer-readable recoding medium. Examples of the computer-readable recording medium include a ROM, a RAM, a CD-ROM, a magnetic tape, a floppy disk, an optical data storage, and a carrier wave (e.g., data transmission through the internet). The computer-readable recording medium may be distributed over a plurality of computer systems connected to a network so that computer-readable code is written thereto and executed therefrom in a decentralized manner. Functional programs, code, and code segments needed to realize the present invention can be easily derived by programmers skilled in the art.

As apparent from the above description, the driving mode control method and apparatus of the hybrid electric vehicle in accordance with the present invention have the following effects.

First, since opening of an engine clutch may be performed earlier than in a general hybrid electric vehicle, the present invention may improve fuel efficiency through decrease of fuel consumption amount by reducing fuel supplied to an engine.

Second, the present invention may improve drivability by further reducing impact generated by opening of the engine clutch.

Third, the present invention may reduce costs by changing a driving mode change control scheme without installing additional components.

It will be appreciated by persons skilled in the art that that the effects that can be achieved through the present invention are not limited to what has been particularly described hereinabove and other advantages of the present invention will be more clearly understood from the above detailed description. Those skilled in the art will appreciate that the present invention may be embodied in other specific forms than those set forth herein without departing from the spirit and essential characteristics of the present invention.

The above description is therefore to be construed in all aspects as illustrative and not restrictive. The scope of the invention should be determined by reasonable interpretation of the appended claims and all changes coming within the equivalency range of the invention are within the scope of the invention.

What is claimed is:

1. A driving mode control method, comprising:
   decreasing, by a controller, a torque of an engine when a first driving mode, in which both the engine and a first motor are driven is switched to a second driving mode, is driven only by the first motor;
   applying, by the controller, a torque of a second motor; and
   opening, by the controller, a clutch when a difference between the engine torque and the second motor torque is less than a first threshold torque,
   wherein the clutch is disposed between the engine and the first motor.

2. The driving mode control method according to claim 1, wherein the applying of the second motor torque includes:
   applying, by the controller, the second motor torque in consideration of the engine torque, a torque of the first motor and a required torque for acceleration.

3. The driving mode control method according to claim 1, wherein the opening of the clutch includes:
   releasing, by the controller, fluid pressure for operating the clutch.

4. The driving mode control method according to claim 3, wherein the releasing of the fluid pressure includes:
   adjusting, by the controller, the first and second motor torques such that a sum of the engine torque and the second motor torque is equal to a second threshold torque based on a decrease of the engine torque.

5. The driving mode control method according to claim 1, when a difference between the engine torque and the second motor torque is less than the first threshold torque and the clutch is in a locked-up state, further comprising:
   cutting off, by the controller, supply of fuel for driving the engine when the engine torque is less than a third threshold torque.

6. The driving mode control method according to claim 1, wherein the second motor is an integrated starter generator (ISG) connected to the engine.

7. The driving mode control method according to claim 1, wherein the applying of the second motor torque includes:
   applying, by the controller, the second torque up to a minimum torque of the second motor torque at a predetermined rate.

8. A non-transitory computer readable medium containing program instructions executed by a controller, the computer readable medium comprising:
   program instructions that decrease a torque of an engine when a first driving mode, in which both the engine and a first motor are driven is switched to a second driving mode, is driven only by the first motor;
   program instructions that apply a torque of a second motor; and
   program instructions that open a clutch when a difference between the engine torque and the second motor torque is less than a first threshold torque,
   wherein the clutch is disposed between the engine and the first motor.

9. The non-transitory computer readable medium of claim 8, further comprising:
   program instructions that apply the second motor torque in consideration of the engine torque, a torque of the first motor and a required torque for acceleration.

10. The non-transitory computer readable medium of claim 8, further comprising:
    program instructions that release fluid pressure for operating the clutch.

11. A driving mode control apparatus, comprising:
    a controller configured to decrease a torque of an engine when a first driving mode, in which both the engine and a first motor are driven is switched to a second driving mode, is driven only by the first motor; and applying, by the controller, a torque of a second motor; and
    a communication unit configured to transmit a control signal to the engine, the first motor, and the second motor,
    wherein the controller is configured to open a clutch when a difference between the engine torque and the second motor torque is less than a first threshold torque,
    wherein the clutch is disposed between the engine and the first motor.

12. The driving mode control apparatus according to claim 11, wherein the controller is configured to apply the second motor torque in consideration of the engine torque, a torque of the first motor, and a required torque for acceleration.

13. The driving mode control apparatus according to claim 11, wherein the controller is configured to release fluid pressure for operating the clutch.

14. The driving mode control apparatus according to claim 13, wherein the controller is configured to adjust the first and second motor torques such that a sum of the engine torque and the second motor torque is equal to a second threshold torque based on a decrease of the engine torque.

15. The driving mode control apparatus according to claim 11, wherein, when a difference between the engine torque and the second motor torque is less than the first threshold torque and the clutch is in a locked-up state, the controller is configured to cut off supply of fuel for driving the engine when the engine torque is less than a third threshold torque.

16. The driving mode control apparatus according to claim 11, wherein the second motor is an integrated starter generator (ISG) connected to the engine.

17. The driving mode control apparatus according to claim 11, wherein the controller is configured to apply the second torque up to a minimum torque of the second motor torque at a predetermined rate.

* * * * *